(12) United States Patent
Beckman

(10) Patent No.: US 7,731,793 B2
(45) Date of Patent: Jun. 8, 2010

(54) FLUID LOSS ADDITIVE WITH IMPROVED RHEOLOGICAL PROPERTIES

(75) Inventor: Kristy J. Beckman, Houston, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 471 days.

(21) Appl. No.: 11/452,164

(22) Filed: Jun. 13, 2006

(65) Prior Publication Data

US 2007/0284104 A1 Dec. 13, 2007

(51) Int. Cl.
*C04B 24/00* (2006.01)
*C04B 24/02* (2006.01)

(52) U.S. Cl. .............................. 106/724; 106/823; 524/2

(58) Field of Classification Search ................. 106/724, 106/823; 524/2
See application file for complete search history.

(56) References Cited

U.S. PATENT DOCUMENTS

| | | | | |
|---|---|---|---|---|
| 5,336,316 | A | * | 8/1994 | Dawson et al. .............. 106/724 |
| 6,739,806 | B1 | * | 5/2004 | Szymanski et al. |
| 7,067,000 | B1 | * | 6/2006 | Szymanski et al. |
| 2006/0041060 | A1 | * | 2/2006 | George et al. |

* cited by examiner

*Primary Examiner*—Paul Marcantoni
(74) *Attorney, Agent, or Firm*—M. Susan Spiering

(57) ABSTRACT

A polymeric fluid loss additive for hydraulic cement which includes a polymer component which exhibits delayed hydration. The fluid loss additive is suitable for use in cement slurries which may be subjected to elevated temperatures, as is common in oil and gas drilling operations. By way of the invention, cement slurries are provided which have improved fluid loss properties at high temperatures, while maintaining manageable rheologies that are conducive to mixing, pumping, and the like across a broad range of temperatures.

12 Claims, 2 Drawing Sheets

FLUID LOSS ADDITIVE WITH IMPROVED RHEOLOGICAL PROPERTIES

TECHNICAL FIELD

The present invention relates generally to formulating cement with fluid loss additives. These types of cement compositions are used to secure a casing string in a wellbore, for example, in connection with petroleum or gas production. Specifically provided are polymeric fluid loss additives which are suitable for use in elevated temperature down hole conditions.

BACKGROUND OF THE INVENTION

Well cementing for oil, gas, or ground water involves mixing a slurry of cement, water, and other additives and pumping it down through a casing to critical points in the oil well annulus around the casing or in the open hole below the casing string. The primary functions of the cementing process are to restrict fluid movement between geological formations and to bond and support the casing. In addition, the cement aids in protecting the casing from corrosion, preventing blowouts by quickly sealing formations, protecting the casing from shock loads in drilling deeper wells, and sealing off lost circulation or thief zones.

A common problem in petroleum well cementing is the loss of filtrate from the cement slurry into porous low pressure zones in the earth formation surrounding the well annulus. This fluid loss is undesirable since it can result in dehydration of the cement slurry, and it causes thick filter cakes of cement solids which can plug the well bore; moreover the fluid lost can damage sensitive formations. Cement fluid loss is particularly critical in a process known as squeeze cementing.

There is a requirement, therefore, for materials which, when added to the cement formulation, reduce the loss of fluid from the slurry to porous formations. The use of partially hydrolyzed polyvinyl alcohol (84-90%) as a fluid loss additive is particularly common. Polyvinyl alcohol and other resins have been used as a fluid loss additives in various forms as is exemplified in the following references.

U.S. Pat. No. 5,728,210, entitled "Composition and Method to Control Cement Slurry Loss and Viscosity" of Moran et al., and U.S. Pat. No. 5,850,880 entitled "Composition and Method to Control Cement Slurry Loss and Viscosity" of Moran et al., utilize polyvinyl alcohol as a liquid fluid loss additive for use in cementing well bores, particularly oil and gas well bores. The liquid fluid loss additive is formed from dissolving partially hydrolyzed polyvinyl alcohol in water. The polyvinyl alcohol has a molecular weight of about 200,000. The polyvinyl alcohol is used in conjunction with a dispersing sulfonated polymer and surfactant. This combination is then adjusted to individual well conditions with chelating agents, cross-linking agents, biocides, antifoams, or combinations of these.

U.S. Pat. No. 6,180,689, entitled "Fluid Loss Control Agents and Compositions for Cementing Oil Wells Comprising said Fluid Loss Control Agent" of Moulin, describes a fluid loss control agent for a petroleum industry (or analogous) cement slurry, comprising a surfactant and a micro-gel obtained by chemical cross-linking of a polyvinyl alcohol. The micro-gel and the surfactant are compatible with petroleum industry cement additives, and can also produce compositions which are gas tight. The micro-gel is obtained by reacting the polyvinyl alcohol in solution with agents which can condense with at least two alcohol functions at a pH of less than 10. The micro-gel is typically prepared in aqueous solution comprising 2% to 5% (by weight), preferably on the order of 3.5%, of cross-linked polyvinyl alcohol.

An aqueous gel that is formed from a polyvinyl alcohol or vinyl alcohol copolymer and a partially methylated melamine-formaldehyde resin in the presence of a pH regulating agent is described in U.S. Pat. No. 5,061,387, entitled "Aqueous Gel System of Partially Methylated Melamine-Formaldehyde Resin and Polyvinyl Alcohol" of Victorius. These gel-forming compositions control the permeability of underground formations during water flooding and chemical flooding operations. These plugging techniques are also used during well workovers, for example, to plug leaks in well casings or to temporarily plug wells, in fracture treatments, to consolidate unconsolidated formations, and to correct the injection profile of a well by sealing high-permeability streaks so that flooding fluids will enter the formation in a more desirable front.

U.S. Pat. No. 5,009,269, entitled "Well Cement Fluid Loss Additive and Method" of Moran et al., relates to cementing of a casing string in a well bore, and more particularly to a fluid loss additive for addition to a cement slurry to be used in the cementing job. Moran et al. describes a fluid loss additive which is stated to be effective at temperatures of up to about 200° F., has limited effect on slurry viscosity, and does not significantly retard cement setting. The additive is comprised of a partially hydrolyzed vinyl acetate polymer, calcium sulfate, a cross-linker for the polymer and, optionally, a defoamer. Because of difficulties in manufacturing a PVOH with a molecular weight above about 200,000, the use of PVOH was considered limited to formation temperatures of about 120° F. This disclosure teaches that the useful temperature can be increased to about 200° F. by including cross-linking materials in the additive. However, at temperatures much above 200° F., the cross-linked PVOH is not thermally stable.

U.S. Pat. No. 4,703,801, entitled "Method of Reducing Fluid Loss in Cement Compositions which may Contain Substantial Salt Concentrations" of Fry et al., discloses a process for reducing fluid loss in cement compositions made with salt water. The compositions are comprised of water, hydraulic cement and a fluid-loss additive comprising a graft polymer having a backbone of lignin, lignite, derivatized cellulose and various synthetic polymers such as polyvinyl alcohol, polyethylene oxide, polypropylene oxide and polyethyleneimine. The grafted pendant groups comprise homopolymers, copolymers and terpolymers of 2-acrylamido-2-methylpropane-sulfonic acid, acrylonitrile, N,N-dimethylacrylamide, acrylic acid, N,N-dialkyl-aminoethylmethacrylate, and their salts. The backbone comprises from about 5 to about 95 percent by weight of the graft polymer, and the pendant groups can comprise from about 5 to about 95 percent by weight of the graft polymer.

Additional references of interest follow. U.S. Pat. No. 6,110,270, entitled "Method for Influencing Moisture Content and Migration in Building Materials" of Beckenhauer, teaches an aqueous PVOH solution for typical use as a coating on building materials in order to prevent the migration of moisture through a porous building. The solutions may contain from about 0.01% to about 30% by weight of PVOH which may have a molecular weight ranging from about 5,000 to about 500,000.

U.S. Pat. No. 6,739,806, entitled "Cement Compositions with Improved Fluid Loss Characteristics and Methods of Cementing Subterranean Formations" to Szymanski et al., discloses methods for preventing fluid loss in cement slurries by connecting two polymers via a pH sensitive crosslinking agent, such as a polyvalent cation. In preferred embodiments, the additive contains a first PVOH polymer with a molecular weight of at least 80,000 and a second PVOH polymer with a molecular weight of about 8,000. The polymers are dissolved in water with a cross-linker and the pH is adjusted until the solution achieves a desired molecular weight. Likewise, U.S. Pat. No. 5,594,050 to Audebert et al. discloses a fluid loss control agent which employs chemically cross-linked PVOH.

U.S. Pat. No. 5,105,885, entitled "Well Cementing Method Using a Dispersant and Fluid Loss Intensifier" of Bray et al., discloses a fluid loss additive package containing an ethoxylate, a dispersant material and, optionally, a water soluble polymeric compound. The polymeric compound may comprise polymers such as polyvinyl alcohol or 2-acrylamido-2-methylpropyl sulfonic acid (AMPS) copolymers.

U.S. Pat. No. 4,569,395 to Carpenter describes the use of a fully hydrolyzed polyvinyl alcohol resin to ameliorate problems with slurry thinning at elevated temperatures. The compositions in the '395 Carpenter references also include, in some embodiments, water soluble cellulosic polymers and dispersants. U.S. Pat. No. 4,967,839, entitled "Method and Composition for Cementing in a Wellbore" of Carpenter et al., discloses a cement composition for oil and gas wells comprising at least 2 weight percent of tricalcium aluminate, at least 2 weight percent of gypsum, and between 0.3 to 2.0 weight percent of a polyvinyl alcohol having a degree of hydrolysis that is less than about 92 percent. According to Carpenter, polyvinyl alcohols with a molecular weight of less than 75,000 are preferred.

Despite the above contributions in the art, the use of conventional polyvinyl alcohol resins as fluid loss additives suffers from various drawbacks. For example, while partially hydrolyzed polyvinyl alcohol exhibits useful fluid loss properties at lower temperatures (up to about 150° F.), it must be added in progressively larger quantities for moderate or high temperature wells where temperatures of up to 250° F. may be encountered. This is problematic, as excessive amounts of fluid loss additive can negatively affect the rheology of the cement slurry making it difficult, if not impossible, to pump.

Some approaches to improve rheology in cementing processes are described in U.S. Pat. No. 4,997,487 to Vinson et al.; U.S. Pat. No. 5,184,680 to Totten et al.; and U.S. Pat. No. 5,273,582 to Totten et al. These references advocate the use of a viscosifying agent, such as guar gum, with a set retarding composition, such as an AMPS-type resin to improve slurry viscosity properties. U.S. Pat. No. 6,708,760 to Chatterji et al. uses a cellulose derived composition to accomplish similar goals. These approaches also have disadvantages, however, such as retarding the set time of the cement, which is not always desired.

There is accordingly provided in one aspect of the present invention a polymeric fluid loss additive having superior fluid loss performance over a broad range of temperatures, even when present in modest quantities. The additive has effective fluid loss properties at high temperatures such as 195° F., and preferably up to 250° F. or more. Additionally, cement slurries prepared with the inventive additive generally maintain rheologies that are suitable for oil field cementing operations; thus, the slurries do not exhibit excessive thickening at surface conditions or thinning at higher temperature down hole conditions.

SUMMARY OF THE INVENTION

According to one aspect of the present invention there is provided an improvement on a method of making a hydraulic cement slurry exhibiting reduced fluid loss, including slurrying the cement and admixing a fluid loss additive therewith, where the improvement includes providing a polymeric fluid loss additive and combining it with the slurry, where the polymer composition has a molecular weight moderated hydration profile such that the polymer composition has a characteristic solubility of less than 50 percent in water at 20° C. for 20 minutes, and a characteristic solubility of at least 90 percent in water at 90° C. for 60 minutes. The polymer composition has a molecular weight distribution such that at least 10 wt. percent component of the polymer composition has a molecular weight that is at least 20% lower than the mean, and also has at least 10 wt. percent component that is at least 20 percent greater than the mean.

The polymer composition used in the invention may have a molecular weight distribution such that it has at least 20 wt. % component (preferably at least 25 wt. %) that is at least 30 percent lower than the mean molecular weight, and at least 20 wt. % (preferably at least 25 wt. %) that is at lest 30 percent greater than the mean.

The polymer composition may include one or more polyvinyl alcohol homopolymers or copolymers. If polyvinyl alcohol resins are used, the polymer composition may exhibit a mean characteristic viscosity in the range of from 30 to 70 cps, and preferably from 40 to 60 cps.

Desirably, the polymeric composition is provided with the slurry in an effective amount such that the slurry exhibits an API fluid loss of less than 100 ml/30 min, and preferably less than 50 ml/30 min, at 195° F.

In another aspect of the present invention there is provided an improvement on a method of recovering oil or gas from a subterranean well which includes slurrying a cement composition with water, admixing a fluid loss additive therewith, and cementing a casing string in a wellbore by pumping the cement slurry down the wellbore and into the annulus between the casing string and an exposed borehole wall; the improvement to the method comprises the steps of:

(1) providing a polymeric fluid loss additive composition which includes a combination of at least two polymers;
(2) selecting the polymer such that the first polymer has a characteristic solubility of less than 50 percent in water at 20° C. for 20 minutes, and a characteristic solubility of at least 90 percent in water at 90° C. for 60 minutes, and a second polymer that has an elevated hydration profile with respect to the first polymer; and
(3) admixing the fluid loss additive with the cement slurry in amounts of from about 0.1% bwoc to about 5% bwoc.

The first and second polymers may be selected such that each polymer has a characteristic solubility in the following suitable parameters: less than 30 percent in water at 20° C. for 20 minutes, and at least 95 percent in water at 90° C. for 60 minutes; less than 20 percent in water at 20° C. for 20 minutes, and about 100 percent at 90° C. for 60 minutes; less than 70 percent in water at 40° C. for 20 minutes, and less than 90 percent in water at 60° C. for 20 minutes.

The first and second polymers used may have a like composition, with the proviso that the molecular weight of the first resin is elevated with respect to the molecular weight of the second. The molecular weight of the first polymer is suitably at least 50% greater, and preferably at least 100% greater, than the molecular weight of the second polymer.

The polymers in the composition may be selected from one or more of the following: polyvinyl alcohol resin, acrylic polymer, polyacrylamide, partially hydrolyzed polyacrylamide, polyacrylate, cellulosic polymer, carboxymethyl cellulose, hydroxyethyl cellulose, polyanionic cellulose, hydroxypropyl methyl cellulose, starch, polysaccharide, hydroxypropyl starch, modified starch, polyionic starch ether, polyvinyl pyrolidone, carboxymethylated polymer, hydroxyalkylated polymer, hydroxypropyl guar, guar gum, diutan gum, welan gum, xanthan gum, biopolymer, polymerized fatty acid, polyglycol, polyalkene glycol, polyglycerol, ester, polyanion lignin, copolymers of any of the preceding, graft modified polymers of any of the preceding, crosslinked polymers of any of the preceding, and combinations thereof.

Also contemplated is oil or gas which is recovered by the improvement of the invention.

In yet another aspect of the present invention, there is provided a hydraulic cement slurry which includes water, cement, and from about 0.1% bwoc to about 5% bwoc of a polymeric fluid loss additive which includes (1) a first polymer which has a characteristic solubility of less than 50 percent in water at 20° C. for 20 minutes, and at least 90 percent at 90° C. for 60 minutes; and (2) a second polymer which has an elevated hydration profile with respect to the first polymer.

The cement slurry may also include from 0.1% bwoc to 2.0% bwoc of dispersant, and preferably from 0.25% bwoc to about 1.0% bwoc of dispersant. Suitable dispersants include polynapthalene sulfonate resins and/or salts thereof.

The slurry desirably exhibits a plastic viscosity of less than 200 cps when measured at 195° F., and a yield point in the range of from 0 to 20 lbs/100 sq. ft at 195° F. The slurry preferably exhibits free fluid values of less than 4%.

Among desirable features, the invention provides for (1) reduced fluid loss, (2) good rheology over broad temperature ranges—not too hard to stir or pump, anti-settling, lower plastic viscosities, and constant properties so that the cement can be placed, and (3) little or no cement set retardation. Still further features and advantages of the invention are apparent from the following description.

BRIEF DESCRIPTION OF THE DRAWINGS

The invention is described in detail below with reference to the Figures in which.

DETAILED DESCRIPTION OF THE INVENTION

Figure 1:
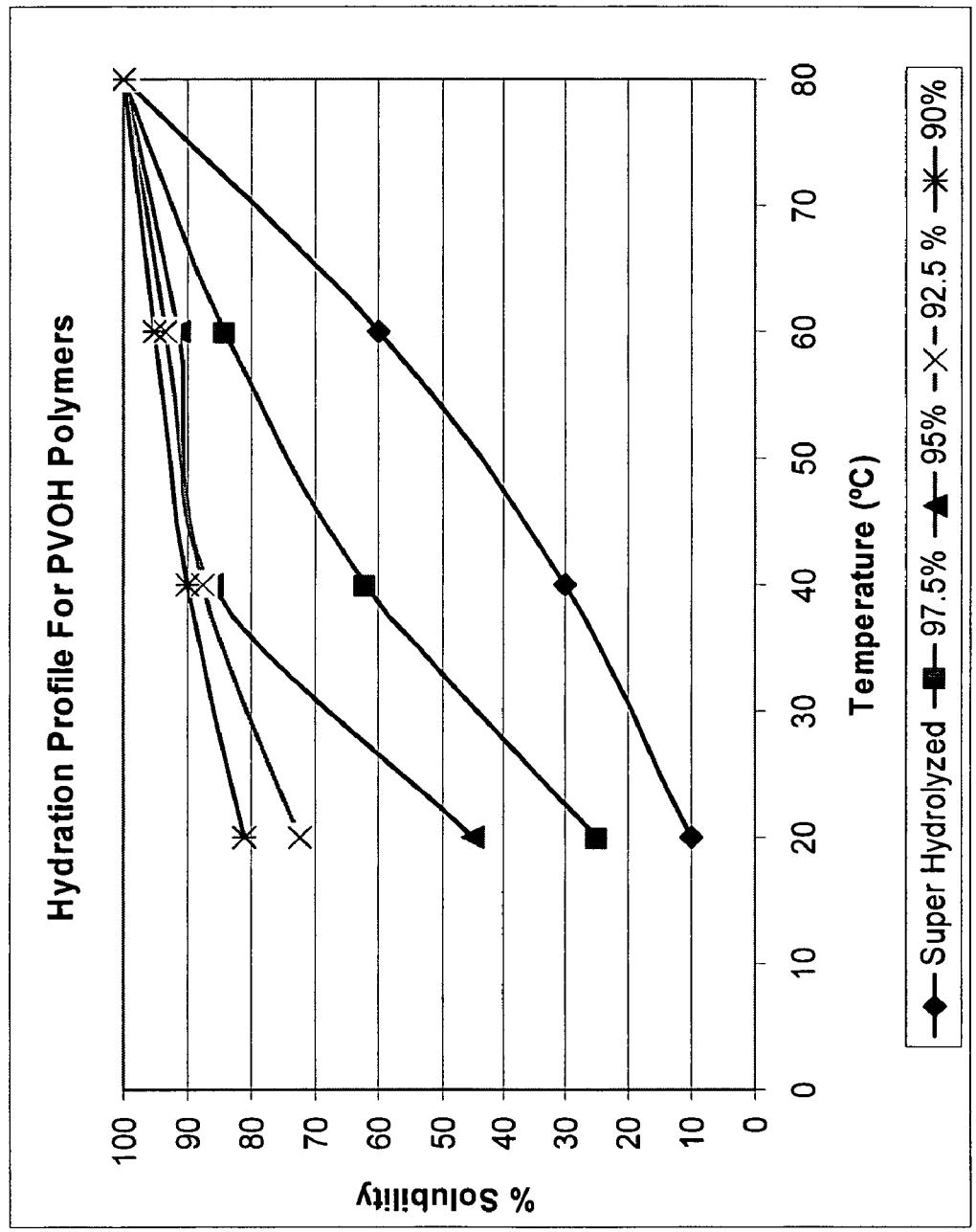
FIG. 1 is a graph of the characteristic solubility in water of polyvinyl alcohol polymers as a function of temperature.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined, terminology as used herein is given its ordinary meaning. Percent, for example, refers to weight percent, or where the context indicates, to mole percent.

"API fluid loss" is measured in accordance with American Petroleum Institute Specification 10 (API 10), Appendix F, July 1990, and is expressed in ml/30 minutes. According to the invention, slurries are measured at a pressure of 1,000 psig and the indicated test temperature.

"By weight of cement," or "bwoc," refers to a weight of an additive in dry form as added to a cement composition based on the cement solids only. For example, 2 parts weight of an additive which is added to 100 parts weight of cement solids is present in an amount of 2% bwoc.

"Characteristic viscosity" relates to the molecular weight of polyvinyl alcohol resins and is measured as the viscosity of a 4% w/w aqueous solution at 20° C. For PVOH resins that have a dissolution temperature higher than 20° C., the polymers are first solubilized in water at higher temperatures, and then cooled to 20° C. for the characteristic viscosity measurement.

The "characteristic solubility," when used in reference to a polymeric fluid loss additive, refers to the solubility of a polymer composition when added to an aqueous solution in an amount of 4 wt. percent. It is measured by combining 4 g of the polymer composition and 96 ml of water, heating at the reported temperature, and stirring for the reported time. According to the invention, the solubility is determined as described in examples 1-4, below.

"Fluid loss" or like terminology refers to any measure of water released or lost from a slurry over time.

"Free fluid," as used herein, refers to the aqueous phase that easily separates from a slurry under gravity separation over time. To test for free fluid, the cement slurry is prepared and conditioned to the test temperature. The slurry is then poured into a graduated cylinder which is placed in a water bath that is maintained at the test temperature. The free fluid is the amount of water, in volume percent, which separates after two hours. Free fluid is measured in accordance with API 10, Appendix M.

The term "hydration profile" refers to the specific solubility properties of a polymer over a range of temperatures (assuming a constant stirring speed and stirring time), until a characteristic solubility of 100% is reached. The hydration profile is useful for determining how readily or quickly a polymer hydrates as the temperature of the solution is increased.

For the purposes of this invention, "plastic viscosity," as used in reference to the slurry, is calculated as the difference between the viscometer reading at 300 RPM ($\theta_{300}$) and the viscometer reading at 100 RPM ($\theta_{100}$), multiplied by 1.5. Thus, plastic viscosity (cps)=($\theta_{300}$−$\theta_{100}$)×1.5. The plastic viscosity is measured at the reported test temperature with a rotational viscometer consistent with the practice and procedures outlined in API 10, Appendix H.

"Yield point" relates to the flow resistance of the cement slurry. It may be calculated from the plastic viscosity as follows: yield point (lb/100 ft$^2$)=$\theta_{300}$—plastic viscosity. The yield point is measured at the indicated test temperature with a rotational viscometer consistent with the practice and procedures outlined in API 10, Appendix H. As noted, the yield point may also be calculated from the plastic viscosity.

In one aspect, the invention relates to an improved fluid loss additive for cementitious slurries. A "cement slurry" or like terminology, as used herein, means an aqueous composition containing solids that have hydraulic cementing properties, that is, set and harden in the presence of water. Included in such compositions may be ground granulated blast-furnace slag, other fillers, natural cement, Portland cement, modified Portland cement, masonry cement, hydraulic hydrated lime, and combinations of these and other materials. Specifications for Portland are set forth in ASTM specification C 150; specifications for cements that are chemically similar or analogous to Portland cement are set forth in ASTM specifications C 1157, C 595, and C 845. A preferred cement for use in the present invention is Class H cement. The cement composition described herein may contain other additives or ingredients and should not be limited to the stated formulations.

According to the compositions and methods of the present invention, a polymeric fluid loss additive is provided to cementitious slurries, where the polymeric fluid loss additive exhibits a unique hydration profile. Generally, the present invention contemplates the use of any suitable polymer composition which provides good fluid loss properties to a cement slurry, and exhibits suitable molecular weight characteristics and solubility properties.

In this regard, the polymer compositions useful in the invention generally go into solution somewhat slowly as the temperature of the water is raised. Typically, polymer compositions which are suitable for use in the invention exhibit a hydration profile such that the compositions have a characteristic solubility of less than 50 percent in water at 20° C. (20 minutes stirring), less than 70 percent at 40° C. (20 minutes stirring), less than 90 percent at 60° C. (20 minutes stirring), but exhibits a characteristic solubility of greater than 90 percent at 90° C. (60 minutes stirring). More desirably the compositions have hydration profiles such that the compositions have characteristic solubilities in water of less than 30 percent, preferably less than 20 percent, at 20° C. (20 minutes stirring); less than 60 percent at 40° C. (20 minutes stirring); less than 80 percent at 60° C. (20 minutes stirring); but exhibits a characteristic solubility of greater than 95 percent, preferably about 100 percent, at 90° C. (60 minutes stirring). More precisely, at 40° C. the characteristic solubility of the polymer composition may be in a preferred range of from 10 to 50 percent, and at 60° C. the characteristic solubility may be in a preferred range of from 40 to 80 percent, when stirred for 20 minutes.

The molecular weight values of polymers will affect their solubility profiles. The compositions of the present invention are also distinctive in that they have multi-component molecular weight characteristics. This can be accomplished, for instance, by employing a combination of two or more polymers which have distinct molecular weights, so that the molecular weight distribution of the overall composition is poly-modal. Alternatively, the multi-component molecular weight property may be accomplished by employing a polymer resin with a sufficiently broad molecular weight distribution, such that a sufficient component of the polymer has a molecular weight that is substantially deviated from the mean. The above hydration and molecular weight characteristics provide for excellent fluid loss and rheological properties over a wide range of temperatures.

Non-limiting examples of suitable polymers may include polyvinyl alcohol resins, acrylic polymer, polyacrylamide, partially hydrolyzed polyacrylamide, polyacrylate, cellulosic polymer, carboxymethyl cellulose, hydroxyethyl cellulose, polyanionic cellulose, hydroxypropyl methyl cellulose, starch, polysaccharide, hydroxypropyl starch, modified starch, polyionic starch ether, polyvinyl pyrolidone, carboxymethylated polymer, hydroxyalkylated polymer, hydroxypropyl guar, guar gum, diutan gum, welan gum, xanthan gum, biopolymer, polymerized fatty acid, polyglycol, polyalkene glycol, polyglycerol, ester, polyanion lignin, copolymers of any of the preceding, graft modified polymers of any of the preceding, crosslinked polymers of any of the preceding, and combinations thereof.

As will be appreciated by a person ordinarily skilled in the art in light of the present specification, the solubility properties of some resins may be controlled by numerous means, including selecting the type of resin(s), the molecular weight of the resin, the degree of hydrolysis of the resin (in the case of polyvinyl alcohol resins), among other factors. Additionally, the hydration profiles of some resins may be manipulated by cross-linking or modification with materials such as glyoxal, glutaraldehyde, borates, zirconates, aluminates, and the like.

Generally, polyvinyl alcohol is a preferred fluid loss additive because it does not retard the set of cement. As used herein, "polyvinyl alcohol resin," "PVOH resin," "PVOH polymer" and like terminology means polyvinyl alcohol resins which are typically prepared from polyvinyl acetate homopolymers or copolymers by saponification thereof which is well known in the art. PVOH resins are derived from homopolymers of vinyl acetate as well as copolymers of vinyl acetate with other ethylenically unsaturated monomers, and may include cationic sites if so desired.

Polyvinyl alcohol resins may be based on vinyl acetate homopolymer or copolymers of vinyl acetate with any suitable comonomer and/or blends thereof. PVOH resins employed in the present invention are predominately (more than 50 mole %) based on vinyl acetate monomer which is polymerized and subsequently hydrolyzed to polyvinyl alcohol. Desirably, the resins are more than 75 mol % vinyl acetate derived, more than 95 mol % percent vinyl acetate derived, and more preferably are 99+mol % vinyl acetate derived. If used, comonomers may be present from about 0.1 to about 50 mol % with vinyl acetate and may include acrylic comonomers such as AMPS or salts thereof. Other suitable comonomers include glycol comonomers, versatate comonomers, maleic or lactic acid comonomers, itaconic acid comonomers and so forth. Vinyl versatate including alkyl groups (veova) comonomers may likewise be useful. See Finch et al., Ed. *Polyvinyl Alcohol Developments* (Wiley 1992), pp. 84 and following. The comonomers may be grafted or co-polymerized with vinyl acetate as part of the backbone. Likewise, homopolymers may be blended with copolymers, if so desired.

In general, polyvinyl acetate in an alcohol solution can be converted to polyvinyl alcohol, i.e. —$OCOCH_3$ groups are replaced by —OH groups through "hydrolysis," also referred to as "alcoholysis." The degree of hydrolysis refers to the mol % of the resin's vinyl acetate monomer content that has been hydrolyzed.

Methods of producing polyvinyl acetate-polyvinyl alcohol polymers and copolymers are known to those skilled in the art. U.S. Pat. Nos. 1,676,156; 1,971,951; and 2,109,883, as well as various literature references, describe these types of polymers and their preparation. These polymers may be functionalized as is known in the art by appropriate incorporation of suitable comonomers. Among the literature references are "Vinyl Polymerization," Vol. 1, Part 1, by Ham, published by Marcel Dekker, Inc., (1967) and "Preparative Methods of Polymer Chemistry," by Sorenson and Campbell, published by Interscience Publishers, Inc., New York (1961).

Commercially available PVOH resins are shown in Table 1 below. Most preferable are PVOH resins which have a high degree of hydrolysis, generally 97 percent or more.

TABLE 1

Polyvinyl Alcohol Resins

| Grade | % Hydrolysis, | Viscosity, cps[1] |
|---|---|---|
| Super Hydrolyzed | | |
| Celvol 125 | 99.3+ | 28-32 |
| Celvol 165 | 99.3+ | 62-72 |
| Fully Hydrolyzed | | |
| Celvol 103 | 98.0-98.8 | 3.4-4.5 |
| Celvol 305 | 98.0-98.8 | 4.5-5.5 |
| Celvol 107 | 98.0-98.8 | 5.5-6.6 |
| Celvol 310 | 98.0-98.8 | 9.0-11 |
| Celvol 325 | 98.0-98.8 | 28.0-32.0 |
| Celvol 350 | 98.0-98.8 | 62-72 |

TABLE 1-continued

Polyvinyl Alcohol Resins

| Grade | % Hydrolysis, | Viscosity, cps[1] |
|---|---|---|
| | Intermediate Hydrolyzed | |
| Celvol 418 | 91.0-93.0 | 14.5-19.5 |
| Celvol 425 | 95.5-96.5 | 27-31 |

[1]4% aqueous solution, 20° C.

Some of the above resins are also available as S or SF grades, which are distinguished from the standard grades in that they have a smaller particle size. The S grades have a particle size, such that 99+% of the product will pass through a U.S.S. 80-mesh screen. The smaller particle PVOH grades are preferred for use in the present invention.

According to one aspect of the invention, the fluid loss additive has at least two highly hydrolyzed PVOH resins with dissimilar molecular weights. The additive includes at least one PVOH resin with an intermediate molecular weight (typically corresponding to a characteristic viscosity in the range of about 10-50 cps) and at least one polymer with an elevated molecular weight, i.e., having a higher characteristic viscosity than the first PVOH resin. The second PVOH resin may have a characteristic viscosity that is at least 50% higher than the first resin, and more desirably at least 75% or 100% higher. In preferred embodiments, the characteristic viscosity of the intermediate Mw resin is in the range of from about 25 to 35 cps, and the characteristic viscosity of the higher Mw PVOH resin is in the range of from about 50-90 cps. Of the polymers listed in Table 1 above, a combination of Celvol 125S (intermediate Mw) and Celvol 165S or SF (high Mw) is preferred. A correlation between the characteristic viscosities of typical polyvinyl alcohol polymers and their molecular weights is shown in Table 2, below:

TABLE 2

| Characteristic Viscosity | Degree of Polymerization | Weight Average Molecular Weight (Mw) | Number Average Molecular Weight (Mn) |
|---|---|---|---|
| 3-4 cps | 150-300 | 13,000-23,000 | 7,000-13,000 |
| 5-6 cps | 350-650 | 31,000-50,000 | 15,000-23,000 |
| 22-30 cps | 1000-1500 | 85,000-124,000 | 44,000-65,000 |
| 45-72 cps | 1600-2200 | 146,000-186,000 | 70,000-101,000 |

Surprisingly, the combination of the low and high molecular weight, highly hydrolyzed resins exhibits a better balance of fluid loss and rheological properties than either of the resins individually. For example, the present Applicant has discovered that the use of a super hydrolyzed PVOH resin with high molecular weight, by itself, is not a robust additive over a broad range of polymer and/or dispersant loadings, sometimes exhibiting excessive thickening at bottom hole temperatures. Likewise, the use of a super hydrolyzed PVOH resin with low-medium molecular weight, alone, was found to have poor fluid loss properties at elevated temperatures and did not provide for superior surface temperature rheologies. The fluid loss additive of the present invention, in contradistinction, provides good fluid loss attributes and rheological properties over a broad temperature range.

For purposes of illustration and explanation, the hydration profiles of various polyvinyl alcohol polymers is shown in FIG. 1. Note that the values are derived from actual solubility data, but are estimates of what the solubility of the resin would be for a given degree of hydrolysis. As can be seen in FIG. 1, a PVOH resin with a degree of hydrolysis of about 90 percent is readily soluble, generally exhibiting over 80 percent solubility at room temperature. The solubility profiles of the polymers decrease with increasing hydrolysis, where a super hydrolyzed resin is seen to slowly solubilize with an increase in temperature, such that it does not reach full solubility until approximately 80° C. Thus, PVOH resins with a lower degree of hydrolysis tend to have an elevated hydration profile as compared to resins with higher levels of hydrolysis; that is, resins with lower levels of hydrolysis are more soluble at a given temperature. Specific solubility values vary to some extent depending on the molecular weight of the polymer, where lower molecular weight resins tend to have an elevated solubility at a given temperature.

Without intending to be bound by theory, it is believed that the lower molecular weight resin begins to solubilize somewhat prior to conditioning near surface conditions; thus, providing for fluid loss control and suspending the cement particles which results in good rheology. Additionally, at higher temperature downhole conditions, it is believed that the higher molecular weight material solubilizes and adds higher temperature fluid loss control without adversely affecting pumpability before the cement can be placed.

For embodiments employing blends or combinations of PVOH resins, the ratio of the intermediate Mw PVOH to high Mw PVOH may vary, but is suitably in the following ranges: 1:10 to 10:1, 1:4 to 4:1, 1:3 to 3:1, and 1:2 to 2:1. A 50:50 ratio of the intermediate and high molecular weight resins is most preferred, as it appears to exhibit the best fluid loss and rheological properties over a wide range of temperatures. This is also surprising as one would generally expect a substantial predominance of one of the resins to exhibit superior performance at a given temperature, especially with regard to fluid loss.

The cement slurries used in the invention may be prepared according to conventional means as are well known in the art. At a minimum, the slurries include water, cement, and the inventive polymeric fluid loss additive. The fluid loss additive compositions of the present invention are preferably provided to the cement slurry as a powder blend. The fluid loss additive may be added to the cement by dry mixing or by a continuous process where the fluid loss additive and water are concurrently added to the cement. Alternatively, the fluid loss additive may be included by addition to the cement mix water, or it may be added directly to the slurry. In some embodiments, where more than one polymer component is added to the slurry, it is contemplated that each of the resins in the additive may be provided to the cement slurry separately, i.e., not in blended form. In any event, the polymeric fluid loss additive may be present in the slurry in a suitable amount ranging from about 0.25% bwoc to about 5.0% bwoc, and preferably from 0.5% bwoc to 1.5% bwoc. The cement slurries are generally prepared to have a density of from about 15 to about 18 lbs/gal and a yield of from about 0.75 to 1.5 cu-ft/sk.

Dispersants are used in cementing operations to reduce the cement slurry viscosity and are preferably employed in the slurry to improve the fluid-flow characteristics. Typically, a dispersant is used in the slurry in amounts ranging from about 0.1 to 3.0% bwoc. The term dispersant is also meant to include those chemicals that also function as a plasticizer, high range water reducer, fluidizer, antiflocculating agent, or superplasticizer for cement compositions. If a dispersant is used in the slurry, it may be any suitable dispersant such as calcium lignosulfonates, beta naphthalene sulfonates, sulfonated melamine formaldehyde condensates, polyaspartates, or sodium naphthalene sulfonate formaldehyde condensate resins, for example, LOMAR® D (Geo Specialty Chemicals) or DAXAD 19 (WR Grace Company). Most preferred are polynaphthalene sulfonate resins (or salts thereof) such as LOMAR® D, especially those with a narrow molecular weight distribution.

Additionally, polycarboxylate dispersants can be used, by which is meant a dispersant having a carbon backbone with pendant side chains, wherein at least a portion of the side chains are attached to the backbone through a carboxyl group or an ether group. Examples of polycarboxylate dispersants can be found in U.S. Pat. Nos. 6,267,814; 6,290,770; 6,310,143; 6,187,841; 5,158,996; 6,008,275; 6,136,950; 6,284,867; 5,609,681; 5,494,516; 5,674,929; 5,660,626; 5,668,195; 5,661,206; 5,358,566; 5,162,402; 5,798,425; 5,612,396; 6,063,184; and 5,912,284; 5,840,114; 5,753,744; 5,728,207; 5,725,657; 5,703,174; 5,665,158; 5,643,978; 5,633,298; 5,583,183; and 5,393,343, which are incorporated herein by reference.

Cement set time retarders may also be added to the cement slurry if it is desired to increase the thickening time of the slurry. This may be useful in situations where the operation time exceeds 2 hours and/or temperatures exceeding 150° F. are encountered. Any conventional retarder may be used. The above mentioned cellulose derivatives typically act as a set-time retarder. Further examples of retarders which can be used herein include lignosulfonates, such as calcium lignosulfonate and sodium lignosulfonate, organic acids, such as citric acid, tartaric acid, gluconic acid and mixtures thereof. The amount of retarder required will vary according to the bottom hole circulating temperatures and variation in the makeup of the cement itself. An exemplary set time retarder is Kelig 32, available from Borregaard LignoTech (Rothschild, Wis.).

Other additives which may be added to the slurry include weighting materials or extenders. "Weighting agent" generally refers to any additive used to increase the density of a slurry, while "extender" generally refers to additives which are used to decrease the slurry density, thereby increasing slurry yield. Suitable weighting agents include density increasing solids such as barium sulfate, fly ash, pozzolan, hematite, ilmenite, silica, and the like. Depending on the density of the materials, certain particulate materials used as fluid loss control agents may also serve as weighting materials. See U.S. Pat. No. 4,102,400 to Crinklemeyer et al. If the density must be reduced, extender agents such as silicate compounds, preferably sodium silicate or sodium metasilicate, may be added in amounts required to reach the desired density. Other conventional extenders or silicate compounds may also be utilized. Alternatively, hollow glass beads may be used to decrease density if needed. As those skilled in the art will realize, the amount of weighting agent or extender to be employed will vary greatly depending on the material used as the additive, the desired weight of the slurry, and the like.

In addition to the above mentioned materials, suitable cement additives may include, but are not limited to: set accelerators, air-entraining agents, anti-foaming agents, anti-settling agents, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, viscosifying agents, and any other admixture or additive that does not adversely affect the properties of the admixture.

The fluid loss additives of the invention are particularly useful for moderate to high temperature well cementing operations, where temperatures as high as 250° F. may be encountered. Accordingly, the slurries should have acceptable fluid loss properties at temperatures up to at least about 195° F. and preferably up to 250° F. The slurries may exhibit suitable API fluid loss values of less than about 100 ml/30 minutes at 195° F. and 1,000 psig. Preferably the API fluid loss values at 195° F. should be less than 50 ml/30 min, or even less than 30 ml/30 min. At 250° F. and 1,000 psig, the slurries desirably have API fluid loss values of less than 100 ml/30 min, and preferably less than 50 ml/30 min.

The cement slurries of the invention should exhibit suitable rheologies at surface temperatures as well as elevated temperatures that are encountered in bottom hole conditions. The rheology of oilfield cements is characterized by a number of laboratory-measured characteristics. The following rheology properties are preferred, and acceptable slurry systems exhibit most or all of the following characteristics.

1) The plastic viscosity (PV) is said to be preferred at a value of 200 cP or less.
2) The yield point (YP) is said to be preferred at a value of 0-20 lb/100-sq. ft.
3) The free fluid should be less than 4%, preferably less than 2%.
4) The viscosity readings taken at 300, 200, 100, 60, 30, 6, and 3 rpm, respectively, are said to be preferred if no reading is less than half of the preceding reading.
5) The 6 rpm and 3 rpm readings should not both be 1.

EXAMPLES

Examples 1-4

In examples 1-4 below, Celvol 125S (super hydrolyzed, c.v. 28-32, 80 mesh particle size) and Celvol 165S (super hydrolyzed, c.v. 62-72, 80 mesh particle size) were measured for solubility at surface conditions (20° C.) and at down hole conditions (90° C.) at various stirring times according to the following procedure.

A hotplate is set at the reported temperature conditions (20° C. or 90° C.) with a magnetic stir bar spinning at 250 rpm inside a 200 ml beaker filled with 96 ml DI water. The water is allowed to equilibrate to the test temperature. The beaker has an agitator inside which is set at variable, but steady speeds of 150 rpm to 450 rpm. 4 g of Celvol sample is added to the DI water. Time is started at the beginning of sample addition, which takes one minute.

Once added, a 0.2 ml sample was taken with a disposable pipette at t=1, 2, 3, 5, 10, 15, 20, 30, 45, and 60 minutes. The sample was placed on the prism of a VEE GEE refractometer (range from 1.3330-1.4098 nD) and a reading was taken. The refractometer was calibrated before use. The refractive index was measured and recorded. The prism was cleaned after each use with lint free and scratch resistant wipes. For the samples coming from the 90° C. cook temperature, 15-seconds passed before the refractive index reading was taken. The concentrations are determined from a standardized curve for each resin; the reported concentrations comprise the average of two measurements.

| Ex. | Polymer | Temp. (° C.) | Concentration of dissolved polymer at time, in minutes (g/100 g solution) | | | | | | | | | |
|---|---|---|---|---|---|---|---|---|---|---|---|---|
| | | | 1 | 2 | 3 | 5 | 10 | 15 | 20 | 30 | 45 | 60 |
| 1 | Celvol125S | 20 | 0.18 | 0.18 | 0.18 | 0.21 | 0.26 | 0.29 | 0.32 | 0.32 | 0.32 | 0.32 |
| 2 | Celvol165S | 20 | 0.03 | 0.11 | 0.11 | 0.11 | 0.11 | 0.11 | 0.11 | 0.11 | 0.11 | 0.11 |
| 3 | Celvol125S | 90 | 0.92 | 1.39 | 2.26 | 2.66 | 3.00 | 3.18 | 3.26 | 3.50 | 4.42 | 6.24 |
| 4 | Celvol165S | 90 | 0.53 | 1.63 | 2.68 | 3.03 | 3.32 | 3.47 | 3.68 | 2.45 | 4.34 | 5.16 |

As can be seen from the above data, the low-medium molecular weight PVOH is about 3 times more soluble at the surface conditions (20° C., 20 minutes) than the high molecular weight PVOH, whereas both resins are readily soluble at the down hole conditions (90° C., 60 minutes). Note, the results for the down hole conditions are higher than the target concentration (4%) due to evaporation of water. The above data corresponds to a characteristic solubility at 20° C. and 20 minutes of 8% for Celvol 125S, and 2.8% for Celvol 165S. Both resins have a characteristic solubility of about 100% at 90° C. and 60 minutes.

The following examples describe the rheological superiority of the preferred embodiment versus materials known in the art. To allow for easy comparison, all slurries were designed to 16.2 pounds per gallon density using API Class H Cement. All slurries also contained 0.02% defoaming agent.

Example 5

The most commonly used polyvinyl alcohol based fluid loss additive known in the industry is based on a partially hydrolyzed, high molecular weight polymer with a characteristic viscosity of approximately 50 cP. Typical cement slurries make use of approximately 0.75% bwoc polymer in combination with approximately 0.25% bwoc dispersant. This combination results in acceptable rheologies and fluid loss values up to temperature of approximately 150° F. (65° C.).

In order to attain higher temperature performance, it is common practice to increase the loading of polymer. For the partially hydrolyzed, high molecular weight PVOH, increased loading tends to upgrade the temperature resistance to provide for acceptable fluid loss properties. Unfortunately, it also tends to result in a very thick slurry with poor rheology. The rheological readings and fluid loss properties of a slurry that is prepared with 1.0% bwoc of a partially hydrolyzed, high molecular weight polymer and 0.5% bwoc dispersant are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft²) |
|---|---|---|---|---|---|---|---|---|---|
| 80° F. | 600 | 243 | 131 | 81 | 42 | 10 | 6 | 704 | −104 |
| 190° F. | 136 | 98 | 53 | 33 | 18 | 4 | 3 | 125 | 12 |

| | Test Temp. (° F.) | Result |
|---|---|---|
| API Fluid Loss (ml/30-min) | 190 | 31 |
| Free Fluid (%) | — | — |

As shown above, the rheological readings indicate a very thick, yet unstable slurry as evidenced by the high PV and low YP at 80° F. and the sudden drops in viscosity from the 30 rpm to the 6 rpm readings. This design does, however, result in what appears to be an acceptable fluid loss value at 190° F. However, the technician observed high free fluid which indicates that the settling camouflaged an otherwise poor fluid loss result. The overall slurry design is unacceptable.

Example 6

For exemplary purposes, the partially hydrolyzed, high molecular weight polyvinyl alcohol resin used in Example 5 was combined with dispersant at slightly different concentrations in an effort to better disperse the cement and improve rheology. Here the polyvinyl alcohol was included at 1.00% bwoc and the dispersant level was 1.00% bwoc. The rheological readings and fluid loss properties are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft²) |
|---|---|---|---|---|---|---|---|---|---|
| 80° F. | 300 | 300 | 184 | 114 | 60 | 12 | 10 | 174 | 126 |
| 194° F. | 158 | 102 | 49 | 30 | 15 | 4 | 2 | 164 | −6 |

|                         | Test Temp. (° F.) | Result |
|---|---|---|
| API Fluid Loss (ml/30-min) | 194 | 16 |
| Free Fluid (%)          | 194 | 38 |

For the combination of 1.00% bwoc partially hydrolyzed, high molecular weight polymer and 1.00% bwoc dispersant shown above, the rheological readings again indicate a very thick, yet unstable slurry as evidenced by the high YP at 80° F., the low YP at 190° F., and the sudden drops in viscosity from the 30 rpm to the 6 rpm readings. This results in what appears to be an acceptable fluid loss value. Here again, the exceptionally high free fluid indicates that the settling camouflaged an otherwise poor fluid loss result. The overall slurry design is unacceptable.

Example 7

The rheological and fluid loss properties of a slurry prepared with a combination of 1.25% bwoc of the partially hydrolyzed, high molecular weight polyvinyl alcohol resin and 0.625% dispersant are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F.  | 300 | 300 | 285 | 204 | 108 | 25 | 14 | 23  | 278 |
| 194° F. | 230 | 153 | 72  | 43  | 23  | 6  | 3  | 237 | −7  |

|                         | Test Temp. (° F.) | Result |
|---|---|---|
| API Fluid Loss (ml/30-min) | 194 | 18 |
| Free Fluid (%)          | 194 | 51 |

This system shows the same tendency for high rheologies and extreme settling as the two earlier slurries based on partially hydrolyzed polyvinyl alcohol at the high loadings needed for high temperature performance. Again, the overall slurry design is unacceptable.

Example 8

As noted above, theory suggests that it might be possible to delay hydration of the polymer and therefore provide for acceptable "surface rheologies" (80° F. tests) as well as prevent "down hole thinning" (194° F. tests) by replacing the partially hydrolyzed material with a fully or super hydrolyzed polymer of the same molecular weight.

In the next example, a cement slurry was prepared with 1.25% bwoc of a>99.3% (super) hydrolyzed polyvinyl alcohol of high molecular weight having a characteristic viscosity of approximately 70 cPs (Celvol 165SF), and 0.625% bwoc dispersant. The rheological and fluid loss values are seen in the Tables below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F.  | 54  | 37  | 18 | 11 | 6  | 1  | 1 | 54  | 0 |
| 194° F. | 246 | 165 | 84 | 53 | 31 | 10 | 8 | 243 | 3 |

|                         | Test Temp. (° F.) | Result |
|---|---|---|
| API Fluid Loss (ml/30-min) | 194 | 30 |
| Free Fluid (%)          | 194 | 4  |

This slurry showed much thinner rheologies at the lower temperature, but rather high rheology at 194° F. The thinner rheologies at surface temperatures in this example may be the result of the hydration of the high molecular weight, super hydrolyzed resin, whereby its solubility in the aqueous slurry increases with temperature, thus accounting for the higher viscosities at 194° F. This product demonstrates a tendency to perform well at the elevated temperature, but the 30 rpm and 6 rpm rheology readings at 80° F. and the two consecutive values of 1 are cause for concern. The overall slurry design is considered unacceptable.

Example 9

The next example demonstrates the results of a slurry prepared with 1.00% bwoc of the high molecular weight, super hydrolyzed polyvinyl alcohol resin used in Example 8 and 0.25% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 58 | 36 | 32 | 24 | 14 | 4 | 2 | 39 | 19 |
| 194° F. | 127 | 111 | 74 | 58 | 46 | 24 | 20 | 80 | 48 |

| | Test Temp. (° F.) | Result |
|---|---|---|
| API Fluid Loss (ml/30-min) | 194 | 59 |
| Free Fluid (%) | 194 | 3.2 |

This slurry showed much better rheologies at 80° F., but again exhibited a rather high rheology at 194° F. This product demonstrates a tendency to perform well at the elevated temperature; however, the 6 rpm and 3 rpm rheology readings at 80° F. and the high YP at 194° F. are cause for some concern. Notwithstanding, the overall slurry design is considered acceptable.

Example 10

In order to allow for a more direct comparison to Example 5, a slurry was prepared with 1.00% bwoc of the super hydrolyzed, high molecular weight polyvinyl alcohol and 0.5% bwoc dispersant. The rheological and fluid loss values are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 49 | 36 | 19 | 12 | 6 | 2 | 1 | 45 | 4 |
| 190° F. | 138 | 99 | 59 | 42 | 27 | 19 | 16 | 119 | 20 |

| | Test Temp. (° F.) | Result |
|---|---|---|
| API Fluid Loss (ml/30-min) | 190 | 28 |
| Free Fluid (%) | — | — |

This slurry again demonstrated much thinner rheologies at the 80° F. temperature, and acceptable rheologies at 190° F. This product demonstrates a tendency to perform well at the elevated temperature. The overall slurry design is acceptable.

Example 11

Next, a slurry design identical in proportion to Example 6 was employed, i.e., 1.0% bwoc of a super hydrolyzed high molecular weight PVOH resin and 1.0% bwoc of dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 47 | 30 | 13 | 8 | 4 | 1 | 1 | 51 | −4 |
| 190° F. | 300 | 300 | 163 | 91 | 49 | 12 | 7 | 206 | 95 |

| | Test Temp. (° F.) | Result |
|---|---|---|
| API Fluid Loss (ml/30-min) | 190 | 13 |
| Free Fluid (%) | — | — |

This design resulted in unacceptable rheologies at the 190° F. temperature setting. The negative YP at 80° F. is undesirable. The overall slurry design is considered unacceptable. In this case, as with Example 6, the high amount of dispersant is believed to significantly contribute to the poor rheology properties.

In any event, due to the failure of Example 8, the super hydrolyzed, high molecular weight polyvinyl alcohol is considered to be non-robust as a fluid loss additive. That is to say, it is unsuitable over broad ranges of polymer loading or dispersant loading. Notwithstanding, the delayed hydration characteristics of the superhydrolyzed, high molecular weight resin showed some improvement in rheology for both surface and downhole conditions. To further investigate this, experiments were attempted utilizing a medium molecular weight version of a super hydrolyzed polyvinyl alcohol.

Example 12

In this example, slurries were prepared with 1.25% bwoc of a medium molecular weight, super hydrolyzed polyvinyl alcohol and 0.375% bwoc dispersant. The PVOH in this example has a characteristic viscosity (50 cP) that is identical to that of the partially hydrolyzed polymer known to provide for good fluid loss and rheological properties at temperatures up to about 150° F. The test results are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 97 | 66 | 34 | 21 | 12 | 4 | 2 | 95 | 3 |
| 195° F. | 215 | 149 | 85 | 59 | 37 | 19 | 17 | 195 | 20 |

| | Test Temp. (° F.) | Result |
|---|---|---|
| API Fluid Loss (ml/30-min) | 195 | 12 |
| Free Fluid (%) | 195 | 1.6 |

The rheologies of this slurry were considered to be acceptable. Fluid loss and free fluid were also acceptable.

Example 13

Further tests were conducted in order to determine the robustness of the additive. In the next example, 0.75% bwoc of the medium molecular weight, super hydrolyzed polyvinyl alcohol was paired with 0.375% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 61 | 40 | 21 | 14 | 8 | 2 | 1 | 60 | 1 |
| 190° F. | 103 | 73 | 50 | 40 | 33 | 20 | 16 | 80 | 24 |

| | Test Temp. (° F.) | Result |
|---|---|---|
| API Fluid Loss (ml/30-min) | 190 | 108 |
| Free Fluid (%) | — | — |

Here again, the rheology is considered acceptable, although the YP at 190° F. is just past the target of 20 lb/100 ft². However, the fluid loss result for this slurry was not acceptable. The tests were repeated four times and resulted in fluid loss values of 301, 26, 68, and 132. The slurry design indicated a lack of robustness.

Example 14

In an effort to provide a direct comparison to Example 5, a slurry was prepared with 1.00% bwoc of the medium molecular weight, super hydrolyzed polyvinyl alcohol and 0.50% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft²) |
|---|---|---|---|---|---|---|---|---|---|
| 80° F. | 76 | 49 | 23 | 14 | 7 | 2 | 1 | 80 | −4 |
| 194° F. | 148 | 94 | 44 | 28 | 17 | 6 | 4 | 156 | −8 |

| | Test Temp. (° F.) | Result |
|---|---|---|
| API Fluid Loss (ml/30-min) | 194 | 19 |
| Free Fluid (%) | 194 | 7 |

The rheology of this system is considered poor due to the negative yield points as well as the drastic drop in rheological readings from the 30 rpm to the 6 rpm setting. Additionally, although fluid loss appeared to be low, the free fluid value at 7% indicates settling and separation of the cement from the water phase. The overall slurry design is unacceptable.

Example 15

For comparison with the polymer and dispersant loadings in Examples 6 and 11, a slurry was prepared having 1.00% bwoc of the medium molecular weight, super hydrolyzed polyvinyl alcohol and 1.00% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft²) |
|---|---|---|---|---|---|---|---|---|---|
| 80° F. | 76 | 49 | 24 | 14 | 7 | 2 | 1 | 78 | −2 |
| 194° F. | 141 | 92 | 44 | 25 | 12 | 3 | 2 | 146 | −5 |

| | Test Temp. (° F.) | Result |
|---|---|---|
| API Fluid Loss (ml/30-min) | 194 | 22 |
| Free Fluid (%) | 194 | 24 |

Here again, the rheology of this system is considered poor due to the negative yield points as well as the drastic drop in rheological readings from the 30 rpm to the 6 rpm setting. Additionally, although fluid loss appeared to be low, the high free fluid value at 24% indicates settling and separation of the cement from the water phase. The overall slurry design is considered to be unacceptable.

Example 16

Next, experiments were conducted using a super hydrolyzed polyvinyl alcohol having a low-medium molecular weight (Celvol 125S). The results for a slurry prepared with 1.00% bwoc of the low-medium molecular weight polymer and 0.50% bwoc of dispersant are shown below. The low-medium molecular weight, super hydrolyzed PVOH resin had a characteristic viscosity of approximately 30 cps.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 43 | 28 | 13 | 8 | 4 | 1 | 1 | 45 | −2 |
| 194° F. | 154 | 99 | 52 | 34 | 22 | 9 | 8 | 153 | 1 |

| | Test Temp. (deg F.) | Result |
|---|---|---|
| APIFluidLoss(ml/30-min) | 194 | 24 |
| FreeFluid (%) | 194 | 3 |

Here, the slurry is deemed to be a little thin due to the two successive values of 1 at the 80° F. temperature and the 3% free water value. The overall slurry design is unacceptable.

Example 17

A further test to determine optimum ratios for the combination of the low-medium molecular weight polymer and dispersant was conducted with 1.00% bwoc of the low-medium molecular weight, superhydrolyzed PVOH resin and 0.25% bwoc of the dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 64 | 32 | 18 | 12 | 10 | 7 | 5 | 69 | −5 |
| 194° F. | 118 | 100 | 61 | 45 | 35 | 20 | 16 | 86 | 33 |

| | Test Temp. (deg F.) | Result |
|---|---|---|
| APIFluidLoss(ml/30-min) | 194 | 1271 |
| FreeFluid (%) | 194 | 4 |

While the rheologies appear to be on the verge of being acceptable, the fluid loss was drastic. The overall slurry design is unacceptable.

Example 18

Example 18 shows the results of a slurry that was prepared with 1.00% bwoc of the low-medium molecular weight PVOH polymer and 1.00% bwoc of dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 44 | 28 | 13 | 8 | 4 | 3 | 2 | 47 | −3 |
| 194° F. | 124 | 76 | 35 | 19 | 9 | 2 | 1 | 60134 | −10 |

| | Test Temp. (deg F.) | Result |
|---|---|---|
| API Fluid Loss (ml/30-min) | 194 | 14 |
| Free Fluid (%) | 194 | 18 |

This slurry was extremely thin as evidenced by the two negative yield points and the high free fluid value. This is in contrast to the thick slurries observed in Examples 6 and 11 which were prepared with the same polymer and dispersant amounts. The overall slurry design is unacceptable.

The conclusions from Examples 16-18 are that the low-medium molecular weight polymer does not provide for the preferred rheologies and fluid loss performance.

Example 19

A final test to determine optimum ratios for the combination of the low-medium molecular weight PVOH resin was conducted with 1.50% bwoc of the low-medium molecular weight PVOH resin and 0.25% bwoc of the dispersant, respectively. The results are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 67 | 45 | 22 | 13 | 7 | 3 | 1 | 68 | −1 |
| 194° F. | 175 | 125 | 73 | 48 | 32 | 22 | 19 | 153 | 22 |

| | Test Temp. (deg F.) | Result |
|---|---|---|
| API Fluid Loss (ml/30-min) | 194 | 48 |
| Free Fluid (%) | 194 | 3 |

This system is nearly acceptable. However, the fact that 1.50% bwoc of the additive would be necessary in order to approach acceptable performance would be an undesirable position from an economic perspective as compared with the blended polymer's usefulness at lower concentrations.

Example 20

Given the acceptable performance seen by the high molecular weight, super hydrolyzed resin in Examples 9, 10, and 12, above, the inventor worked to provide for similar improved performance over a wide range of polymer and/or dispersant loadings, i.e. a more robust formulation. A combination of two polymers with high hydrolysis was tested for rheological and fluid loss properties. A blend of (1) a high molecular weight, super hydrolyzed polyvinyl alcohol, and (2) a low-medium molecular weight, super hydrolyzed polyvinyl alcohol was used to prepare the slurries. The PVOH resins in the blend are Celvol 165SF (Mw≈190,000, characteristic viscosity 62-72 cps), and Celvol 125S (Mw≈130,000, characteristic viscosity 28-32 cps), both of which have a degree of hydrolysis of 99.3+%.

A cement slurry was prepared with a 1.00% bwoc quantity of the blended polyvinyl alcohol described above and 0.5% bwoc dispersant. The blended PVOH resins are present in a 50:50 weight ratio. Rheological and fluid loss properties are shown below.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 64 | 44 | 22 | 12 | 7 | 2 | 1 | 63 | 1 |
| 195° F. | 224 | 163 | 88 | 56 | 32 | 10 | 8 | 204 | 20 |

| | Test Temp. (° F.) | Result |
|---|---|---|
| API Fluid Loss (ml/30-min) | 195 | 24 |
| Free Fluid (%) | 195 | 0 |

Although this slurry shows a somewhat large drop in rheological readings between the 30 rpm and 6 rpm setting, the yield point is positive at both temperatures. The fluid loss result is acceptable and there was no settling witnessed by the technician, as demonstrated by the 0% free fluid result. Tests with this slurry design were repeated twice, each with similar results. The overall slurry design is acceptable.

Example 21

This example explores a further reduction in dispersant, given the large drop between the 30 rpm and 6 rpm readings in Example 16. Here a 1.00% bwoc quantity of the blended polyvinyl alcohol resins (50:50 wt. ratio) described above was combined with 0.25% dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 54 | 36 | 19 | 12 | 6 | 2 | 1 | 53 | 2 |
| 195° F. | 168 | 125 | 80 | 63 | 50 | 29 | 23 | 132 | 36 |

| | Test Temp. (deg F.) | Result |
|---|---|---|
| API Fluid Loss (ml/30-min) | 195 | 32 |
| Free Fluid (%) | 195 | 0 |

With the exception of the somewhat high yield point at 195° F., the results for this slurry are quite good. The test was repeated five times and achieved similar results. The overall slurry design is acceptable.

Example 22

Additional tests were conducted to explore the bounds of the blended fluid loss product. Example 22 pairs 1.25% bwoc of the blended PVOH resin (50:50 wt. ratio) with 0.375% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 64 | 45 | 18 | 14 | 8 | 4 | 3 | 69 | −5 |
| 195° F. | 178 | 147 | 82 | 55 | 38 | 21 | 18 | 144 | 34 |

| | Test Temp. (deg F.) | Result |
|---|---|---|
| API Fluid Loss (ml/30-min) | 195 | 80 |
| Free Fluid (%) | 195 | 0.8 |

The rheology of this slurry is considered to be good, despite the negative yield point at 80° F., due to the very low free water value of 0.8%. The overall slurry design is acceptable.

Example 23

Next, a slurry was prepared with 1.25% bwoc of the blended polyvinyl alcohol fluid loss additive (50:50 wt. ratio) and 0.625% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 79 | 52 | 27 | 17 | 9 | 2 | 1 | 78 | 1 |
| 195° F. | 200 | 140 | 74 | 47 | 26 | 7 | 4 | 60189 | 1 |

| | Test Temp. (deg F.) | Result |
|---|---|---|
| APIFluidLoss(ml/30-min) | 195 | 18 |
| FreeFluid (%) | 195 | 0 |

The results of this slurry are considered very good. In contrast, at similar loadings the partially hydrolyzed, high molecular weight product in Example 7 and the super hydrolyzed, high molecular weight product shown in Example 8 exhibited unacceptable performances.

Example 24

The bounds are further explored with a combination of 1.50% bwoc of the blended polymer and 0.25% bwoc dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 61 | 40 | 21 | 13 | 7 | 2 | 1 | 60 | 1 |
| 195° F. | 250 | 180 | 110 | 80 | 54 | 35 | 32 | 210 | 40 |

| | Test Temp. (deg F.) | Result |
|---|---|---|
| API Fluid Loss (ml/30-min) | 195 | 26 |
| Free Fluid (%) | 195 | 0.8 |

Results of this slurry are acceptable, but show a rather high yield point at 195° F. This experiment was conducted once more with a similar result. The slurry was expected to perform better with slightly more dispersant.

Example 25

Here, more dispersant was added to provide a slurry having 1.50% bwoc of the blended polymer (50:50 wt. ratio) and 0.50% bwoc of the dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 59 | 40 | 20 | 12 | 7 | 2 | 1 | 59 | 1 |
| 195° F. | 222 | 161 | 86 | 56 | 31 | 10 | 7 | 204 | 18 |

| | Test Temp. (deg F.) | Result |
|---|---|---|
| API Fluid Loss (ml/30-min) | 195 | 20 |
| Free Fluid (%) | 195 | 0 |

As anticipated, the overall slurry design is acceptable.

Example 26

Experiments were conducted at an elevated temperature of 250° F. After further experimentation to identify proper additive ratios, a successful slurry design was arrived upon. Example 26 shows a 0.75% bwoc loading of the blended polymer (50:50 ratio) with a 0.875% bwoc loading of dispersant and 0.2% bwoc of an anti-settling agent.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 61 | 40 | 21 | 13 | 7 | 2 | 1 | 60 | 1 |
| 195° F. | 98 | 71 | 38 | 26 | 15 | 4 | 3 | 60 90 | 8 |

| | Test Temp. (° F.) | Result |
|---|---|---|
| API Fluid Loss (ml/30-min) | 250 | 38 |
| Free Fluid (%) | 195 | 0.8 |

The rheologies, fluid loss, and free water performance for this slurry are excellent, demonstrating the blended polymer's usefulness at temperatures as high as 250° F. The overall slurry design is acceptable.

Example 27

As a comparison to examples with 1.0% bwoc dispersant, the PVOH blend was added to a slurry in amounts of 1.00% bwoc with 1.00% bwoc of dispersant.

| Temp. | Visc. @ 300 rpm | Visc. @ 200 rpm | Visc. @ 100 rpm | Visc. @ 60 rpm | Visc. @ 30 rpm | Visc. @ 6 rpm | Visc. @ 3 rpm | PV (cP) | YP (lb/100 ft$^2$) |
|---|---|---|---|---|---|---|---|---|---|
| 80° F. | 45 | 29 | 14 | 9 | 6 | 1 | 1 | 47 | −2 |
| 195° F. | 143 | 94 | 44 | 26 | 12 | 3 | 2 | 149 | −6 |

| | Test Temp. (deg F.) | Result |
|---|---|---|
| API Fluid Loss (ml/30-min) | 194 | 13 |
| Free Fluid (%) | 194 | 19 |

As with the examples 6, 11, 15 and 18, this system shows signs of overdispersion due to the low yield points in combination with acceptable plastic viscosities; thus, it appears that the slurry systems prepared in the examples perform better where the amount of dispersant is kept below about 1.0% bwoc.

Figure 2:
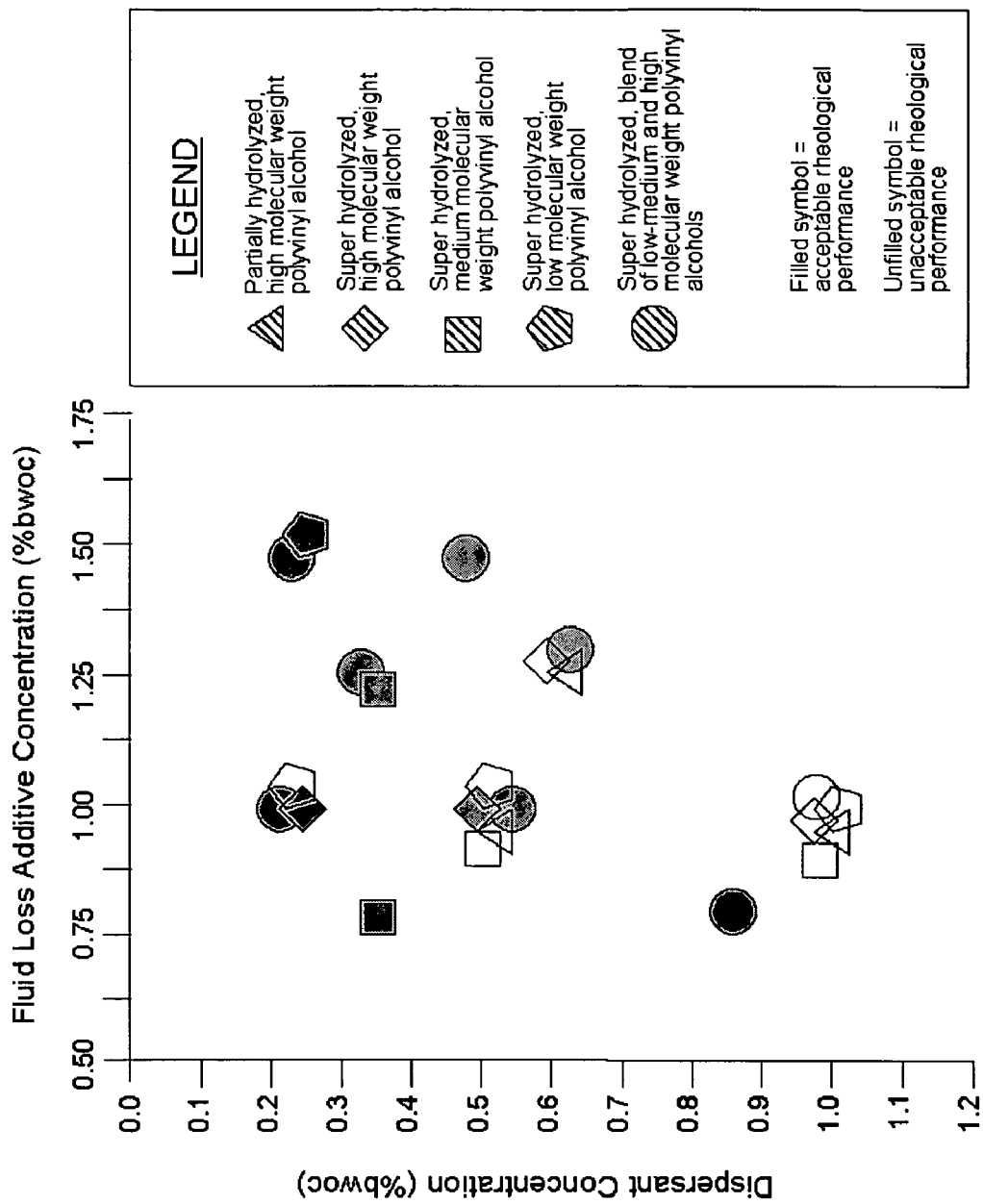
FIG. 2 is a graph of the results of rheological tests on several fluid loss additives, plotted as a function of polymer loading and dispersant loading.

The rheological results of Examples 5-27 are plotted in FIG. 2 as a function of the amount of polymer and the amount of dispersant. As can be seen, the PVOH blend provides for acceptable rheologies over a wide range of polymer and dispersant loadings. With the exception of the overdispersed example, slurries which were prepared with the blend had acceptable rheology profiles. Additionally, note that the blended additive enables acceptable fluid loss properties at temperatures of about 195° F., and even up to 250° F. The superior rheology and fluid loss properties are surprising considering that each of the PVOH resins alone, i.e., the low-medium molecular weight resin and the high molecular weight resin, did not provide for satisfactory slurries. For example, the low-medium molecular weight resin generally produced slurries that were either too thin or had poor fluid loss properties. In this regard, it is unexpected that the blend exhibited suitable surface rheologies, because the low molecular weight resin by itself exhibited somewhat poor surface rheologies, and the high molecular weight component was not thought to contribute significantly to the suspension of cement particles at surface temperatures. It is further unexpected that the blend of PVOH resins with characteristic viscosities of 30 cps and 70 cps exhibited significantly better properties than similar amounts of a PVOH resin having a characteristic viscosity of 50 cPs, where the characteristic viscosity is directly in the middle of the 30 cPs and 70 cPs viscosity values.

The PVOH resins used in the blend in Examples 20-27 were further tested for fluid loss and certain rheology properties using different polymer and/or dispersant loadings, and using the PVOH resins in different blending ratios. Examples 28 to 53, below, show the fluid loss results at 195° F. and the PV and YP values at 80° F. and 195° F. Examples 54 to 64 show the fluid loss results at 250° F. and the PV and YP and YP values at 80° F. and 195° F.

The cement slurries in Examples 28-53, below, were prepared with water and Class H cement, to a density of approximately 16.2 pounds per gallon. A fluid loss additive of the invention was included which consists of a blend of two PVOH resins in the ratios noted below. As above, the PVOH resins in the following examples are Celvol 125S and Celvol 165SF. The slurries also include a dispersant (DAXAD 19) in the amounts listed and about 0.02 gal/sk of an anti-foaming agent (FP6L).

The slurries were tested for plastic viscosity and yield point at 80° F. and 195° F. Fluid loss was also tested according to API 10, Appendix F (July 1990) at a temperature of 195° F. and a test pressure differential of 1000 psig for 30 minutes. The free fluid value of the slurry was measured at 195° F.

| | | API Fluid Loss 195° C. | | | | | | |
|---|---|---|---|---|---|---|---|---|
| Ex. | PVOH (% bwoc) | PVOH ratio (125S:165SF) | Dispersant (% bwoc) | PV, 80° F. (cps) | YP, 80° F. (cps) | PV, 195° F. (cps) | YP, 195° F. (cps) | FF, 195° F. (%) | API Fluid Loss 195° F. (ml/30 min) |
| 28 | 1.75 | 75:25 | 0.875 | 92 | 2 | 300+ | 78 | 1.6 | 6 |
| 29 | 1.75 | 50:50 | 0.875 | 87 | 0 | 300+ | 101 | 0.8 | 12 |
| 30 | 1.75 | 25:75 | 0.875 | 81 | 3 | 300+ | 213 | 0 | 12 |
| 31 | 1.75 | 75:25 | 0.375 | 120 | −5 | 300+ | 117 | 0.8 | 12 |
| 32 | 1.75 | 50:50 | 0.375 | 92 | 3 | 300+ | 150 | 0.8 | 12 |
| 33 | 1.75 | 25:75 | 0.375 | 102 | 0 | 300+ | 300 | 0.8 | 14 |
| 34 | 1.50 | 50:50 | 0.50 | 63 | 1 | 204 | 20 | 0 | 24 |
| 35 | 1.50 | 50:50 | 0.50 | 59 | 1 | 204 | 18 | 0 | 20 |
| 36 | 1.50 | 50:50 | 0.25 | 60 | 3 | 210 | 41 | 3.2 | 18 |

-continued

API Fluid Loss 195° C.

| Ex. | PVOH (% bwoc) | PVOH ratio (125S:165SF) | Dispersant (% bwoc) | PV, 80° F. (cps) | YP, 80° F. (cps) | PV, 195° F. (cps) | YP, 195° F. (cps) | FF, 195° F. (%) | API Fluid Loss 195° F. (ml/30 min) |
|---|---|---|---|---|---|---|---|---|---|
| 37 | 1.50 | 50:50 | 0.25 | 60 | 1 | 210 | 40 | 0.8 | 26 |
| 38 | 1.25 | 50:50 | 0.625 | 78 | 1 | 189 | 11 | 0 | 18 |
| 39 | 1.25 | 50:50 | 0.375 | 71 | 46 | 300+ | 300 | 0 | 603 (calc) |
| 40 | 1.00 | 50:50 | 0.50 | 50 | 1 | 161 | 30 | 2.4 | 48 |
| 41 | 1.00 | 50:50 | 0.50 | 47 | −2 | 120 | 9 | 1.6 | 21 |
| 42 | 1.00 | 50:50 | 0.25 | 53 | 2 | 132 | 36 | 0 | 32 |
| 43 | 1.00 | 50:50 | 0.25 | 47 | −3 | 108 | 14 | 3.2 | 56 |
| 44 | 1.00 | 50:50 | 0.25 | 39 | −1 | 138 | 0 | 3.2 | 32 |
| 45 | 1.00 | 50:50 | 0.25 | 45 | −3 | 123 | 7 | 3.2 | 38 |
| 46 | 1.00 | 50:50 | 0.25 | 51 | 0 | 162 | 30 | 3.2 | 22 |
| 47 | 1.00 | 50:50 | 0.25 | 47 | 1 | 105 | 36 | 4 | 38 |
| 48 | 0.75 | 75:25 | 0.875 | 44 | 1 | 86 | −5 | 2.4 | 12 |
| 49 | 0.75 | 50:50 | 0.875 | 50 | −1 | 111 | 3 | 2.4 | 20 |
| 50 | 0.75 | 25:75 | 0.875 | 48 | 0 | 105 | 0 | 6.4 | 4 |
| 51 | 0.75 | 75:25 | 0.375 | 56 | 3 | 102 | 11 | 5.6 | 155 (calc) |
| 52 | 0.75 | 50:50 | 0.375 | 48 | 2 | 96 | 29 | 0.8 | 175 (calc) |
| 53 | 0.75 | 25:75 | 0.375 | 51 | 2 | 101 | 29 | 1.6 | 74 |

The cement slurries in Examples 54-64, below, were also prepared with water, class H cement, and a fluid loss resin blend consisting of Celvol 125S and Celvol 165SF in various ratios. The slurries were prepared at a density of approximately 16.2 pounds per gallon. The slurries in these examples include a dispersant (DAXAD 19), about 0.02 gal/sk of an anti-foaming agent (FP6L) and 0.2% bwoc of an anti-settling agent (SA541).

The slurries were tested for plastic viscosity and yield point at 80° F. and 195° F. Fluid loss was tested according to API 10, Appendix F (July 1990) at a temperature of 250° F. and a pressure of 1000 psig for 30 minutes. The free fluid value of the slurry was measured at 250° F.

As can be seen from the above tables, the loading level of the polymer, the loading of the dispersant, and the ratio of the PVOH resins can be adjusted to provide for acceptable fluid loss and rheology characteristics in slurries at temperatures up to 195° F., and even up to or exceeding 250° F. The above results indicate that the 50:50 blend of high and low-medium molecular weight resins is preferred. It also appears that in certain systems, the rheology properties are superior where the polymer loading is less than 1.75% bwoc.

While the invention has been illustrated in connection with several examples, modifications to these examples within the spirit and scope of the invention will be readily apparent to those of skill in the art. In view of the foregoing discussion, API Fluid Loss 250° C.

| Ex. | PVOH (% bwoc) | PVOH ratio (125S:165SF) | Dispersant (% bwoc) | PV, 80° F. (cps) | YP, 80° F. (cps) | PV, 195° F. (cPs) | YP, 195° F. (lb/100 sq.ft.) | FF, 250° F. (%) | API Fluid Loss 250° F. (ml/30 min) |
|---|---|---|---|---|---|---|---|---|---|
| 54 | 1.75 | 75:25 | 0.875 | 80 | 2 | 300+ | 230 | 0 | 100 |
| 55 | 1.75 | 50:50 | 0.875 | 119 | −1 | 300+ | 300 | 0 | 42 |
| 56 | 1.75 | 25:75 | 0.875 | 87 | 2 | 300+ | 300 | 0 | 341 (calc) |
| 57 | 1.75 | 75:25 | 0.375 | 116 | −3 | 300+ | 300 | 1.71 | 260 (calc) |
| 58 | 1.75 | 50:50 | 0.375 | 108 | 1 | 300+ | 300 | 2.15 | 76 |
| 59 | 1.75 | 25:75 | 0.375 | 135 | −2 | 300+ | 300 | 1.77 | 461 (calc) |
| 60 | 1.25 | 50:50 | 0.625 | 59 | 1 | 162 | 10 | 4 | 742 (calc) |
| 61 | 0.75 | 75:25 | 0.875 | 47 | −3 | 81 | 4 | 4.0 | 98 |
| 62 | 0.75 | 50:50 | 0.875 | 60 | 1 | 90 | 8 | 0.8 | 38 |
| 63 | 0.75 | 25:75 | 0.875 | 63 | −1 | 123 | 15 | 0.4 | 896 (calc) |
| 64 | 0.75 | 25:75 | 0.375 | 48 | 1 | 71 | 10 | 1.6 | 645 (calc) |

What is claimed is:

1. A method of making a hydraulic cement slurry exhibiting reduced fluid loss comprising the steps of slurrying a hydraulic cement composition with water and admixing a fluid loss additive therewith, the improvement comprising:
   i providing a polymeric fluid loss additive which consists essentially of a polyvinyl alcohol (PVOH) blend and a dispersant, wherein the PVOH blend includes a first polyvinyl alcohol polymer and a second polyvinyl alcohol polymer, wherein both the first polyvinyl alcohol polymer and the second polyvinyl alcohol polymer have a degree of hydrolysis of at least 99%;
   wherein the first polyvinyl alcohol polymer has a characteristic viscosity of about 10 to 50 cps;
   wherein the second polyvinyl alcohol polymer has a characteristic viscosity which is about 50% to 100% higher than the characteristic viscosity of the first polyvinyl alcohol polymer; and
   ii combining the polymeric fluid loss additive with the cement slurry.

2. The method according to claim 1, wherein the first polyvinyl alcohol polymer is present in the PVOH blend at 25 wt % or greater, based on the total amount of the PVOH blend present.

3. The method according to claim 1, wherein the first polyvinyl alcohol polymer is present in the PVOH blend at 50 wt % or greater, based on the total amount of the PVOH blend present.

4. The method according to claim 1, wherein the first polyvinyl alcohol polymer, the second polyvinyl alcohol polymer, or both comprise one or more polyvinyl alcohol homopolymers or copolymers.

5. The method according to claim 4, wherein the polymer exhibits a mean characteristic viscosity in the range of from 30 to 70 cPs.

6. The method according to claim 4, wherein the polymer composition exhibits a mean characteristic viscosity in the range of from 40 to 60 cPs.

7. The method according to claim 1, wherein the hydraulic cement slurry has an API fluid loss value of less than 100 ml/30 minutes at 195° F.

8. The method according to claim 1, wherein the hydraulic cement slurry has an API fluid loss value of less than 50 ml/30 minutes at 195° F.

9. The method according to claim 1, wherein the first polyvinyl alcohol polymer is present in the PVOH blend at 75 wt % or greater, based on the total amount of the PVOH blend present.

10. The method according to claim 1, wherein the polymeric fluid loss agent is present in the hydraulic cement slurry in a range from about 0.25% bwoc to about 5.0% bwoc.

11. The method according to claim 1, wherein the polymeric fluid loss agent is present in the hydraulic cement slurry in a range from about 0.5% bwoc to about 1.5% bwoc.

12. The method according to claim 1, wherein the dispersant is present in the hydraulic cement slurry in a range from about 0.1% bwoc to about 3.0% bwoc.

* * * * *